US008318887B2

(12) United States Patent
Arpac et al.

(10) Patent No.: US 8,318,887 B2
(45) Date of Patent: Nov. 27, 2012

(54) SILOXANE COMPOSITE-BASED LIGHT-WEIGHT OPTICAL LENSES

(75) Inventors: Ertugrul Arpac, Antalya (TR); Savas Guven, Antalya (TR); Carsten Schmidt, Saarbruecken-Guedingen (DE); Helmut Schmidt, Saarbruecken-Guedingen (DE); Daisuke Mochizuki, Shizuoka (JP); Kazuhito Osada, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/933,235

(22) PCT Filed: Mar. 19, 2009

(86) PCT No.: PCT/EP2009/053234
§ 371 (c)(1),
(2), (4) Date: May 10, 2011

(87) PCT Pub. No.: WO2009/115566
PCT Pub. Date: Sep. 24, 2009

(65) Prior Publication Data
US 2011/0201735 A1 Aug. 18, 2011

(30) Foreign Application Priority Data

Mar. 20, 2008 (EP) .................................. 08102830

(51) Int. Cl.
*C08G 77/60* (2006.01)
*G02C 7/02* (2006.01)

(52) U.S. Cl. .......................................... 528/35; 351/159

(58) Field of Classification Search .................. 528/35; 524/430, 492, 493, 588; 351/41, 159
See application file for complete search history.

(56) References Cited

U.S. PATENT DOCUMENTS

| 4,102,970 | A | * | 7/1978 | Deubzer et al. ............ 264/176.1 |
| 4,243,692 | A | | 1/1981 | Scholze et al. |
| 5,512,609 | A | * | 4/1996 | Yang ............................... 523/107 |
| 5,593,781 | A | | 1/1997 | Nass et al. |
| 5,910,522 | A | | 6/1999 | Schmidt et al. |
| 6,103,837 | A | * | 8/2000 | Hiiro et al. ...................... 525/464 |
| 6,226,120 | B1 | * | 5/2001 | Feldman ......................... 359/399 |
| 2001/0038494 | A1 | * | 11/2001 | Blomberg et al. .............. 359/642 |
| 2006/0016448 | A1 | * | 1/2006 | Ho .................................. 126/698 |
| 2007/0225466 | A1 | * | 9/2007 | Matsumoto et al. ............ 528/25 |
| 2009/0250218 | A1 | | 10/2009 | Akarsu et al. |

FOREIGN PATENT DOCUMENTS

| JP | 07-041582 A | 2/1995 |
| WO | 2007/121972 A | 11/2007 |

* cited by examiner

*Primary Examiner* — Peter Szekely
(74) *Attorney, Agent, or Firm* — Abel Law Group, LLP

(57) ABSTRACT

Disclosed is a process of preparing a moulded article, comprising 1) hydrolyzing a) at least one silane having one non-hydrolysable organic group, and b) at least one compound selected from b1) a silane having two non-hydrolysable organic groups, and b2) a hydrolysable polysiloxane, or a mixture thereof, and c) optionally at least one silane having no non-hydrolysable organic group, to prepare a composite composition comprising a hydrolysate or condensate, 2) placing the composite composition in a mould, 3) curing the composite composition to increase the degree of condensation, 4) removing the moulded article from the mould, and 5) heat treating the moulded article at a temperature of at least 100° C. The moulded article is preferably an optical lens which may be used for automobile headlights.

20 Claims, No Drawings

SILOXANE COMPOSITE-BASED LIGHT-WEIGHT OPTICAL LENSES

BACKGROUND OF THE INVENTION

1. Field of the Invention

The present invention relates to moulded articles, especially optical lenses, based on an organically modified siloxane condensation product, to the use of said moulded articles, and to a method of preparing such moulded articles.

2. Discussion of Background Information

High-performance optical lenses are generally made of inorganic glass because inorganic glass provides high optical quality by homogeneous melting processes, high thermal stability, especially in combination with high-power light sources, which are used for instance in cars, and high shape stability even at temperatures of up to 200° C. However, a serious disadvantage is the high specific weight of such lenses resulting in heavy-weight optical systems, e.g. headlights of automotive applications. Thus, the weight of two headlights easily add up to more than 1 kg. Because any additional weight in a car leads to considerable increase of fuel consumption, weight reduction in headlights is an important target for new optical system developments.

In order to substitute inorganic glasses having densities of 2.2 to 2.5 g/cm$^3$ by components having lower densities, highly transparent organic polymers have been considered. However, the demands of temperature stability, UV and light stability as well as temperature independent shape stability could not be solved in the past. In addition, materials suitable for high throughput forming technologies are required. A mechanical shaping such as grinding and polishing is time-consuming and hence impractical. Thermoplastic polymers such as PMMA or PC can be processed by injection moulding techniques, but their thermal and/or UV stability is insufficient. Other known polymers do not enable high throughput moulding techniques. Silicones exhibit sufficient temperature stability, however, easy to mould silicones are more or less rubber-like and do not satisfy the requirements to shape stability. It is to say that at present no technical polymers are available for this purpose which meet with the demands discussed.

Thus, an object of the present invention is to provide a material suitable for light-weight high-performance optical lenses for transportation purposes, especially headlights for automotive applications, and a respective fabrication process which is cost-effective and allows a high throughput.

SUMMARY OF THE INVENTION

It has surprisingly been found that this object can be accomplished by means of a condensation product based on hydrolysable silane compounds as a matrix, preferably synthesized via a sol-gel process, wherein the components used are balanced in such a way that, on the one hand a highly cross-linked three-dimensional network is obtained, but, on the other hand sufficient flexibility is maintained to enable complete condensation. This can be achieved by an appropriate mixture of silanes providing three-dimensional cross-linking and chain forming silanes.

Accordingly, the present invention provides a process for a molded article. The process comprises:

(1) hydrolyzing
   (a) at least one silane of formula RSiX$_3$ (I), wherein R is a non-hydrolyzable organic group, and the groups X, which may be the same or different, represent hydrolyzable groups, and
   (b) at least one compound selected from at least one of
      (b1) silanes of formula R$_2$SiX$_2$ (II), wherein the groups R, which may be the same or different, represent non-hydrolyzable organic groups, and the groups X, which may be the same or different, represent hydrolyzable groups, and
      (b2) hydrolyzable polysiloxanes comprising non-hydrolyzable organic groups,
   (c) optionally, at least one silane of formula SiX$_4$ (III), wherein the groups X, which may be the same or different, represent hydrolyzable groups, to prepare a composite composition comprising at least one of a hydrolyzate and a condensate of the hydrolyzable components, wherein nanoscale inorganic particles may be added to the composite composition or a precursor thereof,
(2) placing the composite composition in a mold,
(3) curing the composite composition to increase the degree of condensation to prepare a molded article,
(4) removing the molded article from the mold, and
(5) heat treating the molded article at a temperature of at least 100° C.

In one aspect of the process, at least one substance in the gaseous state selected from water and organic solvents may be fed to an atmosphere under which (5) is carried out.

In another aspect, component (c) may be present.

In yet another aspect, the non-hydrolyzable groups R of the silanes of formula (I) and (II) and the non-hydrolyzable organic groups of the polysiloxanes may be selected from one or more of alkyl, aryl, alkylaryl, and aralkyl groups, for example, C$_1$-C$_4$-alkyl groups such as, e.g., methyl.

In a still further aspect, component (b2) may comprise a linear polysiloxane.

In another aspect of the process of the present invention, from 70 to 50 wt.-% of (a), from 20 to 40 wt.-% of (b), and from 0 to 20 wt.-% of (c), based on a total weight of (a), (b) and (c), may be used in (1). For example, at least 1 wt.-% of (c) may be used.

In another aspect of the process, at least one further substance selected from inorganic nanoscale particles, organic solvents and hydrolyzable oligosiloxanes may be incorporated into the composite composition or a precursor thereof before, during or after hydrolysis. For example, nanoscale inorganic particles which comprise oxides may be incorporated.

In yet another aspect of the process, in (1) water may be used in such an amount that a ratio of water to hydrolyzable groups of components (a), (b), and (c) is from 0.2 to 0.8.

In a still further aspect of the process, (1) may be carried out in at least two steps comprising pre-hydrolysing one or more hydrolyzable components of relatively lower hydrolysis reactivity to obtain a pre-hydrolyzate reaction mixture and subsequently adding one or more hydrolyzable components of relatively higher hydrolysis reactivity to the reaction mixture. For example, the one or more hydrolyzable components of relatively higher hydrolysis reactivity may be added to the pre-hydrolyzate reaction mixture when the content of free water in the reaction mixture is at or close to the minimum concentration.

In another aspect of the process of the present invention, (3) may be carried out at least partially at an elevated temperature of at least 40° C. and/or (3) may comprise at least two different stages wherein a first stage comprises curing at a temperature below the boiling point of the solvent contained in the composite composition, and a second stage comprises curing at a temperature of at least 80° C.

In another aspect, prior to placing the composite composition in a mold at least a part of water and/or organic solvent may be removed from the composite composition of (1).

In another aspect, in the process may further comprise carrying out a thermal post-treatment of the molded article at a temperature of at least 150° C. after (5).

The present invention further provides a molded article, e.g., a molded article which is present as an optical lens, which is obtainable by the process of the present invention as set forth above (including the various aspects thereof), and a molded article, e.g. a molded article which is present as an optical lens, that comprises a glassy, organically modified condensation product of
- (a) at least one silane of formula $RSiX_3$ (I), wherein the group R is non-hydrolyzable organic group, and the groups X, which may be the same or different, represent hydrolyzable groups, and
- (b) at least one compound selected from at least one of
  - (b1) silanes of formula $R_2SiX_2$ (II), wherein the groups R, which may be the same or different, represent non-hydrolyzable organic groups, and the groups X, which may be the same or different, represent hydrolyzable groups, and
  - (b2) hydrolyzable polysiloxanes comprising non-hydrolyzable organic groups, and
- (c) optionally, at least one silane of formula $SiX_4$ (III), wherein the groups X, which may be the same or different, represent hydrolyzable groups, and, optionally, nanoscale inorganic particles embedded in the condensation product.

In one aspect of the molded article of the present invention, the molded article may be in the form of a film or a sandwich or may form a part of a sandwich.

In another aspect, the molded article of the present invention may be comprised in a vehicle such as, e.g. an automobile. For example, the molded article may be comprised in an automobile headlight.

In yet another aspect, the molded article may be or may be comprised in an optical component. For example, the optical component may comprise one or more of a fiber, a lens array, a prism, a magnifying glass, and an eye glass.

DETAILED DESCRIPTION OF THE INVENTION

The moulded articles obtained by the process of the invention exhibit excellent properties. Thus, it was possible to fabricate clear lenses having high transparency, which are thermally stable and dimensionally stable even at temperatures of 500° C. over a long period, and also resistant to moisture and UV light. In addition, the optical lenses obtained by the inventive process are significantly lighter than high-performance optical lenses made of inorganic glass according to the prior art. Moreover, the process of the invention is relatively easy and inexpensive and hence suitable as a high throughput forming technique. The present invention will now be described below in detail.

The first step of the process of the invention is the preparation of a composite composition comprising a hydrolysate or condensate of hydrolysable components comprising an appropriate mixture of silanes providing three-dimensional cross-linking and chain forming silanes. For this purpose, a) at least one silane represented by formula $RSiX_3$ (I), wherein R is a non-hydrolysable organic group, and X, which may be the same or different, is a hydrolysable group; and b) at least one compound selected from b1) a silane represented by formula $R_2SiX_2$ (II), wherein R, which may be the same or different, is a non-hydrolysable organic group, and X, which may be the same or different, is a hydrolysable group, and b2) a hydrolysable polysiloxane comprising non-hydrolysable organic groups, or a mixture thereof; and optionally c) at least one silane represented by formula $SiX_4$ (III), wherein X, which may be the same or different, is a hydrolysable group, are hydrolysed to prepare a hydrolysate or condensate of these hydrolysable compounds.

The silicon compounds of formulae (I) to (III) as well as the polysiloxane are well known to the persons skilled in the art. A wide variety of such silanes and polysiloxanes are commercially available or can be prepared by known methods; cf. W. Noll, "Chemie and Technologie der Silicone", Verlag Chemie GmbH, Weinheim/Bergstraβe (1968).

The non-hydrolysable organic group R of formulae (I) to (III) is generally linked via a carbon atom which is directly attached to the silicon atom and can not be removed hydrolytically. The hydrolysable or hydrolytically removable groups X of formulae (I) to (III) can be hydrolysed, i.e. replaced by a hydroxy group OH when reacted with water. In general, also the hydrolysable polysiloxane comprising non-hydrolysable organic groups comprises hydrolysable groups X and non-hydrolysable organic groups R as defined below. While the symbols R and X are used for all formulae it is clear that groups R and X, respectively, can be the same or different for the compounds of formulae (I) to (III) and the polysiloxane used in process of the invention. The following examples and preferred examples for groups R and X apply to all formulae (I) to (III) and also to the hydrolysable polysiloxane used unless otherwise noted.

Examples of hydrolysable groups X are hydrogen or halogen (F, Cl, Br or I, preferably Cl or Br), hydroxy, alkoxy (preferably $C_{1-6}$alkoxy, for instance methoxy, ethoxy, n-propoxy, isopropoxy and n-butoxy, sec-butoxy, isobutoxy, and tert-butoxy), aryloxy (preferably $C_{6-10}$aryloxy, such as phenoxy), alkaryloxy, for instance benzoyloxy, acyloxy (preferably $C_{1-6}$acyloxy, such as acetoxy or propionyloxy), alkylcarbonyl (preferably $C_{2-7}$alkycarbonyl, such as acetyl), isocyanato, $NH_2$, mono- or disubstituted amino, e.g. monoalkylamino or dialkylamino each alkyl group having preferably from 1 to 6 carbon atoms, amido, for instance benzamido or aldoxime, or ketoxime groups. Two or three X groups may also be joined to one another, for example in the case of Si-polyol complexes with glycol, glycerol or pyrocatechol.

Preferred hydrolysable groups X are halogen, in particular Cl, alkoxy groups, and acyloxy groups. Particularly preferred hydrolysable groups are $C_{1-4}$alkoxy groups, especially methoxy and ethoxy. The most preferred group X is ethoxy.

Examples of the non-hydrolysable organic group R are alkyl, for instance $C_{1-20}$-alkyl, in particular $C_{1-4}$-alkyl, such as methyl, ethyl, n-propyl, i-propyl, n-butyl, i-butyl, sec-butyl and tert-butyl, alkenyl, for instance $C_{2-20}$-alkenyl, especially $C_{2-4}$-alkenyl, such as vinyl, 1-propenyl, 2-propenyl and butenyl, alkynyl, for instance $C_{2-20}$-alkynyl, especially $C_{2-4}$-alkynyl, such as ethynyl or propargyl, aryl, especially $C_{6-10}$-aryl, such as phenyl and naphthyl. The alkyl, alkenyl and alkinyl groups may be linear or branched and include also cyclic compounds such as cyclic $C_{3-12}$-alkyl and -alkenyl groups, e.g. cyclopropyl, cyclopentyl and cyclohexyl. The alkyl or aryl groups may be substituted by aryl or alkyl groups, respectively, for which the same examples as above can be mentioned. Examples of such corresponding aralkyl and alkaryl groups are tolyl, phenylethyl and benzyl. The groups R mentioned may comprise one or more other customary substituents such as halogen, alkoxy or hydroxy or other functional groups but it is preferred that group R has no other substituents.

Preferred non-hydrolysable group R are selected from alkyl, aryl, alkylaryl, and aralkyl, in particular alkyl and phenyl. The group R is more preferably $C_{1-4}$-alkyl and in particular ethyl and methyl. The most preferred group R is methyl. The silanes of formula (I) are preferably alkylsilanes, more preferably alkyltrialkoxysilanes. The silanes of formula (II) are preferably dialkylsilanes, more preferably dialkyldialkoxysilanes. The silanes of formula (III) are preferably tetraalkoxysilane. The hydrolysable polysiloxane is preferably a polydialkylsiloxane.

Specific, non-limiting examples of hydrolysable silanes of formula (I) are methyl-trimethoxysilane, methyltriethoxysilane (MTEOS), methyltripropoxysilane, ethyltrimethoxysilane, ethyltriethoxysilane, propyltrimethoxysilane, propyltriethoxysilane, n-butyltrimethoxysilane, methylsilicon trichloride, ethylsilicon trichloride, phenyltriethoxysilane, and phenyltrimethoxysilane. Non-limiting examples of hydrolysable silanes of formula (II) are dimethyldiethoxysilane (DMDEOS), dimethyldimethoxysilane, dimethylsilicon dichloride, diphenyldiethoxysilane, and diphenylsilicon dichloride. Non-limiting examples of the silanes of the formula (III) are $Si(OCH_3)_4$, $Si(OC_2H_5)_4$, $Si(OC_3H_7)_4$, $SiCl_4$, $HSiCl_3$, $Si(OOCCH_3)_4$ wherein tetraethoxysilane (TEOS) is particularly preferred.

The hydrolysable polysiloxane having a non-hydrolysable organic group, if used, may be cyclic, linear or branched and is preferably a cyclic or in particular a linear polysiloxane (linear chain polymer). The polysiloxane may have one hydrolysable group but has preferably two or more hydrolysable groups, in particular two hydrolysable groups. As mentioned above, the hydrolysable groups and the non-hydrolysable organic groups of the polysiloxane are preferably selected from the hydrolysable groups X and the non-hydrolysable organic groups R as defined above. Poly(dialkylsiloxanes), in particular poly(dimethylsiloxanes), are preferably used. In a preferred embodiment, the polysiloxanes can be derived from the silanes of formula (II). In this case, the polysiloxane can be considered as a condensation product of a silane of formula (II) prepared in advance. A description of suitable polysiloxanes and examples and synthesis procedures thereof can be found for instance in W. Noll, "Chemie and Technologie der Silicone", Verlag Chemie GmbH, Weinheim/Bergstraβe (1968), chapters 5 and 6. Further examples of suitable polysiloxanes and their preparation can be found e.g. in the standard literature: Stone, Graham, Inorganic Polymer, Academic Press, New York, 1962. A wide variety of said polysiloxanes are commercially available.

The starting compounds for the preparation of the condensation product include silanes having three hydrolysable groups and optionally silanes having four hydrolysable groups by which a highly cross-linked three-dimensional network can be achieved. On the other hand, silanes having two hydrolysable groups and/or polysiloxanes which are capable of forming linear chains are a further component which provides sufficient flexibility to enable an essentially complete condensation of the product.

While the ratio of the components may vary in broad ranges, an improved balance can be obtained if from 75 to 45 wt.-% of silane a), i.e. the silane of Formula (I), from 15 to 45 wt.-% of compound b), i.e. the silane of Formula (II) and/or the polysiloxane, and from 0 to 25 wt.-% of silane c), i.e. the silane of Formula (III), based on the total weight of components a), b) and c), preferably from 70 to 50 wt.-% of silane a), from 20 to 40 wt.-% of compound b), and from 0 to 20 wt.-% of silane c), based on the total weight of components a), b) and c), more preferably from 65 to 55 wt.-% of silane a), from 25 to 35 wt.-% of compound b), and from 5 to 15 wt.-% of silane c), based on the total weight of components a), b) and c), are used in step 1). The favourable composition comprises for instance about 60 wt.-% of silane a), about 30 wt.-% of compound b), and about 10 wt.-% of silane c), based on the total weight of components a), b) and c). It is preferred that component c) is also used to prepare the composite composition. Thus, preferably at least 1 wt.-%, more preferably at least 4 wt.-% of silane c), based on the total weight of components a), b) and c), are used.

In a preferred embodiment a combination of alkyltrialkoxysilane, in particular methyl-triethoxysilane (MTEOS), dialkyldialkoxysilane, in particular dimethyldiethoxysilane (DMDEOS) and/or a hydrolysable polydialkylsiloxane, in particular polydimethylsiloxane (PDMS) and, if used, a tetraalkoxysilane, in particular tetraethoxysilane (TEOS) are used. The composition of the favourite starting material is about 60 wt.-% MTEOS, about 30 wt.-% DMDEOS, and about 10 wt.-% TEOS. The silane of formula (II) such as DMDEOS can be replaced partially or completely by a polysiloxane such as PDMS. The use of a silane of formula (II) is preferred. If a polysiloxane is used, a complete replacement of the silane of formula (II) is preferred.

The starting Si materials are hydrolysed in the presence of water, preferably by the sol gel process. The hydrolysis of hydrolysable silicon compounds is a process well known by the persons skilled in the art, in which the hydrolysable silanes are partially or completely hydrolysed, i.e. the hydrolysable group X is substituted by a hydroxy group. As the hydrolysed species obtained are susceptible to condensation reactions in which Si—OH groups condense to form a siloxane linkage (Si—O—Si) the reaction mixture may contain such condensation species. Hydrolysates or condensates are understood to mean in particular partially or completely hydrolysed or at least partly condensed species of the hydrolysable starting compounds. Instead of the hydrolysable monomer compounds, it is also possible to use already precondensed compounds (oligomers).

The hydrolysate or condensate is preferably obtained by hydrolysis and condensation of the hydrolysable starting compounds by the sol-gel process. In the sol-gel process, the hydrolysable compounds are hydrolyzed with water, optionally in the presence of acidic or basic catalysts, and may be at least partly condensed. Examples of acidic catalysts are water soluble inorganic acids such as hydrochloric acid, phosphoric acid or organic acids such as formic acid. Examples of basic catalysts are NaOH, KOH, $NH_3$, 1-methylimidazole, and organometallic compounds such as NaOMe. The sol which forms may be adjusted e.g. to the viscosity desired by virtue of controlling suitable parameters, for example temperature, reaction time, aging time, degree of condensation, solvent or pH. Further details of the sol-gel process are described, for example, in C. J. Brinker, G. W. Scherer: "Sol-Gel Science— The Physics and Chemistry of Sol-Gel-Processing", Academic Press, Boston, San Diego, New York, Sydney (1990).

Preference is given to hydrolysis of the hydrolysable Si components in the presence of acidic catalysts, for instance at a pH of from 1 to 3. For the hydrolysis, it is possible to use stoichiometric amounts of water, but also smaller or greater amounts are feasible. Preference is given to employing a substoichiometric amount of water based on the hydrolysable groups, i.e. ROR<1. The ratio of the amount of water used for the hydrolysis of the hydrolysable compounds to the amount of hydrolysable groups of the compounds to be hydrolysed (ROR value) is preferably from 0.2 to 0.8 mol and more preferably from 0.4 to 0.6 mol of water per mole of the hydrolysable groups of the compounds to be hydrolysed.

It has been found that moulded articles with improved properties such as transparency, heat resistance, resistance to moisture and mechanical strength can be obtained when hydrolysis is carried out as a so-called chemically controlled condensation process (CCC process). By the CCC process, a separation of the starting components due to different hydrolysis and condensation rates can be avoided. Without wishing to be bound on any theory, it is assumed that the application of the CCC process results in a homogeneous distribution of network forming units derived from silanes a) and c) and chain forming units derived from silanes/polysiloxanes b) in the condensate of the composite and subsequently in the moulded articles to be obtained. That is, local concentrations of e.g. chain forming units in the matrix formed by the condensate are avoided so that a significantly more homogeneous overall matrix is achieved. The homogeneous distribution of the flexibilizing units in the matrix may support an enhanced degree of condensation in the moulded article formed.

In the CCC process hydrolysis is carried out in at least two steps by hydrolysing one or more hydrolysable components of lower hydrolysis reactivity to obtain a pre-hydrolysate reaction mixture and subsequently adding one or more hydrolysable components of higher hydrolysis reactivity to the reaction mixture. The hydrolysis reactivity of silanes is generally known by the persons skilled in the art. For instance, tetraalkoxysilane such as TEOS generally have a lower reactivity than alkyltrialkoxysilanes such as MTEOS and alkyltrialkoxysilanes such as MTEOS in turn have a lower reactivity than dialkyldialkoxysilanes such as DMDEOS. The reactivity may be dependent on the conditions applied during hydrolysis, e.g. the pH value. If three hydrolysable components are used, the component of lowest reactivity is hydrolysed in the first step and the component of highest reactivity is hydrolysed in the second step and the component of median reactivity may be included in the first or in the second step. Alternatively, hydrolysis is carried out in three steps wherein the hydrolysable components are added subsequently in the order of increasing reactivity. A corresponding procedure may be used if more than three components are used. It is important that the component of lowest reactivity is used in the first step.

In general water is consumed by a hydrolysis reaction. However, condensation reactions which may occur after the hydrolysis generates water, i.e. free water is again released. That is, initially the water amount in the hydrolysis reaction mixtures decreases to a minimum and then increases again due to condensation reactions. In the CCC process, it is preferred that components with lower reactivity, e.g. tetraalkoxysilane are mixed with water in the first step, in general the total amount of water to be added for hydrolysis of all components of the composite composition, and hydrolysis (pre-hydrolysis) is continued until the content of free water in the mixture reaches a minimum or is near that minimum; at this point of time faster reacting components (in general network forming silanes, such as dimethyldiethoxy silane) are added. In this way, a direct condensation reaction of Si—OR groups of the components of higher reactivity and HO—Si groups of already hydrolysed components of lower reactivity takes place to form a Si—O—Si bond. Thus, the component of higher reactivity is chemically linked to the other components, and no phase separation is possible. As a result, the condensate obtained is homogeneous with respect to the distribution of the units derived from silanes of different reactivity which is not the case if the different hydrolysable compounds are hydrolysed at once.

The content of free water in the reaction mixture or the minimum thereof can be determined by several methods known by the skilled person, e.g. by IR spectroscopy, Karl Fischer titration or determination of the clear point (when the two phases initially formed in the reaction mixture coalesce into one phase).

Generally, solvents in various concentrations can be added to the reaction mixture. Examples are alcohols, preferably lower aliphatic $C_1$-$C_8$-alcohols, such as methanol, ethanol, 1-propanol, isopropanol and 1-butanol, ketones, ethers, amides such as dimethylformamide, tetrahydrofuran, dioxane, sulfoxides, or high-boiling solvents, for example polyethers. It is also possible to use water as a solvent, especially when the hydrolysis reaction has been completed to a sufficient extent. Preferred solvents are alcohols such as ethanol. Solvents can be also generated in the reaction mixture; for instance hydrolysis of silanes having alkoxy groups produces free alcohol molecules. In a preferred embodiment, the composite composition comprises an organic solvent which has been added and/or which is generated in situ.

Hydrolysis can be carried out at different temperatures, e.g. in the range of room temperature (23° C.) to the boiling point of the solvent. If hydrolysis has been catalysed by an acidic catalyst first, bases can be added after said acid catalysed hydrolysis step. By this way, the degree of condensation of the silanes can be increased. Bases such as NaOH, KOH, $NH_3$, 1-methylimidazole, organometallic compounds such as NaOMe etc. can be used purely or diluted in water and organic solvents. In this case, it is preferred to add the base to the hydrolysis product obtained by acidic catalysis after drying it to constant weight under the condition of reduced pressure, e.g. at a temperature of 35 to 45° C. and a pressure of 35 to 25 mbar. The base is added for instance in a concentration of up to 0.01 wt.-%, based on such hydrolysis product dried to constant weight.

Further ingredients, for instance nanoscale inorganic particles or hydrolysable oligosiloxanes may be added to the composite composition or a precursor thereof. Other ingredients can be incorporated, for instance wetting aids, antioxidants, flow control agents, stabilizers, and dyes, if necessary for the intended purpose. The ingredients may be added in any order, for instance before, during or after hydrolysis, preferably after the hydrolysate or condensate has been formed. The addition of nanoscale inorganic particles is suitable to regulate the viscosity and enhances the control of the coefficient of thermal expansion of the moulding to be formed. Moreover, the incorporation of said nanoparticles leads to an increased inorganic network density of the moulded article such as a lens.

The nanoparticles can be added at concentrations in the range of e.g. 0 to 40 wt.-%, for instance 1 to 40 wt.-%, based on the total dry weight of the composite composition, i.e. the weight of the composition without volatile components (solvents). The inorganic nanoscale particles are preferably selected from oxides, including hydrated oxides, phosphates, sulphates, silicates, titanates, zirconates, stannates, plumbates, aluminates and corresponding mixed oxides, of metals or semi-metals such as Si and B, the oxides of metals or semi-metals being preferred. Examples of suitable nanoparticle materials are oxides such as $B_2O_3$, $Al_2O_3$, AlOOH, $SiO_2$, ZnO, $TiO_2$, $ZrO_2$, $CeO_2$, $SnO_2$, $La_2O_3$, $Fe_2O_3$, $Ta_2O_5$, $Hf_2O_5$, $Nb_2O_5$, $Cu_2O$, $V_2O_5$, $MO_3$, $WO_3$, and also mixed oxides such as PZT, spinel compounds, or barium titanate. Preferred nanoscale particles are $SiO_2$, $Al_2O_3$, AlOOH, $TiO_2$, and $ZrO_2$.

Nanoscale particles or nanoparticles generally refer to particles having an average diameter of not more than 1.000 nm. In the present invention, the use of nanoparticles having an average diameter of less than 100 nm, in particular less than 50 nm is preferred. The average diameter here means the volume average particle diameter ($d_{50}$ value) which can be measured by UPA (ultrafine particle analyser, Leeds Northrup (laser-optical method; dynamic laser light scattering). To measure very small particles it is also possible to use electron microscopy methods (e.g. via HR-TEM).

These nanoscale particles can be produced according to standard procedures, for example by the Stöber process for $SiO_2$, peptisation of $Al_2O_3$ with HCl, and generally by flame pyrolysis, plasma methods, colloid techniques, sol-gel processes, controlled nucleation and growth processes, MOCVD methods and emulsion methods. These methods are described comprehensively in the literature. Nanoparticles are commercially available, for instance aqueous silica sols of Bayer AG (Levasile®) or Nissan Chemicals (IPA-ST, MA-ST, MEK-ST, MIBK-ST). Examples of pyrogenic silicas are the Aerosil® products of Degussa.

The nanoparticles can be used as such or alternatively surface-modified. The surface modification may be used to alter the properties of the nanoparticles, for instance for compatibilization purposes. Surface-modified nanoparticles comprise radicals, such as inorganic or organic groups or molecules attached to the surface of the particles. The preparation of the surface-modified particles can be carried out by surface modification of nanoscale particles by reacting it with a surface modifier or by the preparation of these particles in the presence of surface modifiers. The surface modification of nanoscale particles is a known process; see for example WO 93/21127 or WO 96/31572. If a surface modifier is used to surface modify the nanoscale particles the concentration of the surface modifier is preferably 1 to 20 wt.-%, more preferably 5 to 15 wt.-%, for instance about 10 wt.-% based on the weight of the nanoparticles.

The surface modifier comprises a functional group capable of interacting with reactive groups on the surface of the nanoparticle such as hydroxy groups. Such interaction may include covalent or ionic bonding, complexation or dipole-dipole interaction, hydrogen bonds and van der Waals interaction between the nanoparticle and the surface modifier. The formation of covalent bonds is preferred. The surface modifier can be selected according to the type of nanoparticle used and the intended purpose. Examples of appropriate surface modifiers, in particular for nanoscale oxide particles, e.g. $SiO_2$, are hydrolysable silanes such as silanes of formula (I), inorganic and organic acids, such as saturated or unsaturated mono- and polycarboxylic acids, the corresponding acid anhydrides, acid chlorides, esters and acid amides, bases, chelate formers, complexing agents, such as β-dicarbonyl compounds, e.g. β-diketones, amino acids, proteins, mono- and polyamines, oximes, and alcohols, wherein silanes, for instance organoalkoxysilanes and chloroalkoxysilanes, and complexing agents are preferred.

Functionalized oligosiloxanes (disiloxanes, trisiloxanes etc.) may be also added to the composite composition. The functional group of the oligosiloxane may be a hydrolysable group, e.g. an alkoxy or chloride group. The amount of the oligosiloxane added can vary in broad ranges, generally the amount may range from 0 to 10 wt.-%, for instance 1 to 10 wt.-%, based on the total dry weight of the composite composition. Said oligosiloxanes are conveniently added after excess solvent has been removed from the composite composition as explained below.

After having prepared the composite composition it is often convenient to remove at least a part of water and/or organic solvent from the composite composition obtained from step 1) prior to placing the composite composition in a mould, for instance by evaporation, in order to achieve an appropriate viscosity for the following steps by removing excess solvent and/or shorten the period of time necessary for the following steps.

For preparing a moulded article, the composite composition having an appropriate viscosity is placed in a mould and used as moulding material. Any conventional moulding methods can be used, for instance casting and injection moulding, in particular casting. The mould has a shape which is adapted to the desired moulded article to be formed which is preferably a lens. The moulded article may be in the form of a sandwich, optionally containing layers of different composition, or a film. The mould may be made from any suitable material, for instance glass, metal or plastic.

The composite composition in the mould is then cured to enhance the condensation degree of the hydrolysate or condensate. Curing can be effected by allowing the composite composition to stand for a certain period of time at environmental temperature in the mould. It is however preferred to employ a high-temperature treatment to cure the composite composition in the mould. The curing step is preferably carried out at least partially at an elevated temperature of at least 40° C., more preferably at an elevated temperature of at least 80° C. and still more preferably of at least 90° C. The maximum temperature in the curing step is preferably less than 170° C., and more preferably less than 160° C.

It is preferred to carry out the curing step as a two step or multi-step process wherein the curing temperature used in the first stage is lower than in the second stage. If more than two curing steps are employed, the curing temperature of each subsequent step is usually higher than that of the preceding step. In general, a time and temperature schedule is realised in which the temperature is increased with a predetermined heating rate to a predetermined temperature which is maintained for a predetermined period of time after which this procedure can be repeated one or more times by increasing the temperature further with a predetermined second heating rate to a predetermined second temperature which is maintained for a predetermined second period of time, and so on.

In the first curing step, the maximum temperature should not exceed the boiling temperature of the solvent contained. Otherwise an unwanted increase of bubble formation is observed. The bubbles may be entrapped in the forming matrix and locally weaken the sol-gel matrix structure. This may result in a mechanical breakdown (crack-formation) at higher temperatures. In a preferred embodiment the curing step thus comprises at least two different stages wherein the first stage comprises curing at a temperature below the boiling point of the solvent contained in the composite composition, and a second stage comprises curing at a temperature of at least 80° C., preferably at least 90° C. In the first stage, the curing can be effected at environmental temperature but is preferably carried out at a temperature of at least 40° C.

The total period of the curing step strongly depends on the type of material and the temperatures used, and on the dimensions of the moulded article to be formed but may be for instance in the range of 1 h to 100 h, preferably 4 h to 60 h.

During the curing step the degree of condensation of the condensate is increased and usually a least a part or substantially all of the solvent and/or water remained or newly formed by hydrolysis or condensation reactions are removed. As a result, the composite composition is sufficiently dimensionally stable to form the moulded article which is removed from the mould.

The moulded article obtained after the curing step is not yet sufficiently stable as the resistance to heat and solvents is insufficient. Crack formation occurs even at relatively low temperatures. Crack formation during the curing/drying process is a result of non-uniform shrinkage and mass loss. The theory of thermomechanical stress can be directly applied to the non-uniform solvent distribution in sol-gel bodies. Hence, the stress is directly proportional to the flux of the solvents from the surface and the width of the sample, and inversely proportional to the diffusion coefficient at the surface. In any case, the admissible rate of drying is inversely proportional to the dimensions of the object. Therefore, in practice considerable drying time is necessary to preserve crack-free samples.

Therefore, the moulded article is heat treated after removal from the mould at a temperature of at least 100° C., preferably at a temperature of at least 140° C. The treatment can be effected under any atmosphere, for instance air or an inert gas atmosphere (e.g. $N_2$, Ar) or a combination thereof. This annealing is preferably carried out by a controlled atmosphere drying process, in which at least one component in a gaseous state selected from water and an organic solvent is fed to the atmosphere under which the heat treatment of step 5) is carried out. The solvent is preferably the solvent contained in the composite composition, preferably an alcohol such as ethanol. Thus, any tension in the moulded article, particularly the lens material, can be avoided. By this procedure it is also possible to avoid crack formation even at temperatures of up to 200° C.

Water and/or organic solvent can be supplied by any suitable means into the atmosphere. For instance, water and/or organic solvent can simply be introduced as a liquid into an oven where the heat treatment is effected. The liquid will evaporate into the atmosphere of the oven due to the elevated temperature. Alternatively or additionally containers containing the desired liquid(s) can be connected to the space in which the heat treatment is effected via tubing. The containers can be heated by separate means to evaporate the liquids contained in the container and supply them in the atmosphere under which the annealing takes place. The supply can be controlled for instance by valves. A gas, preferably an inert gas (e.g. compressed air, argon, nitrogen) can be used as a carrier gas for the vapour of water and/or organic solvent.

Heat treatment is preferably carried out such that the partial pressures of water and/or organic solvent in the atmosphere can be controlled. In this way, different overall partial pressures of water and organic solvent can be adjusted in the atmosphere, e.g. inside an oven chamber. It is also possible to vary said partial pressures in relation to the completion of the curing and drying process, respectively, during the heat treatment, for instance by gradually decreasing the partial pressures as the treatment proceeds.

The heat treatment is preferably carried out as a multi-step process, wherein the temperature of each subsequent step is usually higher than that of the preceding step. In general, a time and temperature schedule is realised in which the temperature is increased with a predetermined heating rate to a predetermined temperature which is maintained for a predetermined period of time after which this procedure can be repeated one or more times by increasing the temperature further with a predetermined second heating rate to a predetermined second temperature which is maintained for a predetermined second period of time, and so on. In a preferred heat treatment the maximum temperature reached is in the range of 160 to 250° C., preferably 160 to 220° C.

The total period of the heat treatment step depends of course on the pre-treatment, the dimensions of the moulded article, the type of material and the temperatures used, but is for instance more than 10 h, preferably more than 24 h, and more preferably more than 40 h.

It is further preferred, in particular in the case of the preferred heat treatment under an atmosphere to which water and/or an organic solvent in the gaseous state has been added, to carry out a thermal post-treatment of the moulding obtained, for instance at a temperature of at least 150° C., preferably at least 180° C. The temperature of the thermal post-treatment should be not more than 500° C. The thermal post-treatment is usually carried out in air (environmental atmosphere), but thermal post-treatment for instance in an inert atmosphere (inert gases) or an atmosphere to which water and/or an organic solvent in the gaseous state has been added is also possible. Surprisingly, a significant improvement of the coefficient of thermal expansion of the moulded article is achieved by such thermal post-treatment as is demonstrated in the examples.

The process of the invention provides a moulded article comprising a glassy condensation product, preferably a glassy, organically modified condensation product, of the silane a) and the compound b) and optionally silane c) which may comprise also nanoscale particles and/or oligosiloxane or the reaction products derived therefrom. The moulded article can show high transparency, is thermally and dimensionally stable even at temperatures of 500° C., and also resistant to moisture and UV light. In addition, the moulded articles obtained are significantly lighter than corresponding moulded articles made of conventional glass. The moulded articles is preferably a transparent moulded article which can be used as an optical moulded article such as a lens.

A preferred application field of the moulded articles are vehicles, in particular automobiles. The process of the invention is especially suited for the preparation of optical lenses. Such lenses can be used for instance for headlights, in particular automobile headlights.

The moulded articles, which may be e.g. in the form of lenses, sandwiches or films, are also suitable for optical components such as fibers, lens arrays, prisms, magnifying glasses and eye glasses.

The following examples are provided for the purpose of illustrating the invention but are not intended to limit it in any way.

EXAMPLES

A. Preparation of Composite Compositions

Example 1

In a 500 ml glass flask 20.8 g of tetraethoxysilane (TEOS) are diluted with 23 g ethanol and stirred for 5 min. Thereafter 25.2 g of a solution of hydrochloric acid in water (0.1 N, ROR=0.5) are added and the solution obtained is stirred for 30 min at room temperature. 107 g of methyltriethoxysilane (MTEOS) are then added slowly to this solution. After an additional period of 5 min 44.5 g of dimethyldiethoxysilane are added dropwise and the mixture obtained is stirred for 12 h.

Example 2

In a 500 ml glass flask 20.8 g of tetraethoxysilane and 107 g of methyltriethoxysilane are mixed with stirring. The reaction mixture is cooled to −5° C. To this mixture 25.2 g of a solution of hydrochloric acid in water (0.1 N, ROR=0.5) are added and the solution obtained is stirred for further 5 minutes. Subsequently, 25 g of polydimethylsiloxane (PDMS S12) are added and the solution is stirred for 10 min. The solution is then heated to 120° C. oil bath temperature and refluxed for 4 hours.

Solvent and ethanol formed by hydrolysis are evaporated at a water bath temperature of 40° C. under reduced pressure.

Example 3

In a 500 ml glass flask 20.8 g of tetraethoxysilan (TEOS) are diluted with 23 g ethanol and stirred for 5 min. Subsequently, 25.2 g of a solution of hydrochloric acid in water (0.1 N, ROR=0.5) are added and the solution obtained is stirred for 30 min at room temperature. To this solution 107 g of methyltriethoxysilane (MTEOS) are added slowly. After further 5 min 44.5 g of dimethyldiethoxysilane are added dropwise and the solution obtained is stirred for 12 h. Thereafter, 10 g of silica nanoparticles are added and the reaction mixture is stirred for 2 h. Solvent and ethanol formed by hydrolysis are evaporated from the composition obtained at a water bath temperature of 40° C. under reduced pressure.

B. Moulding and Curing of Composite Compositions of Examples 1 to 3

The compositions of examples 1 to 3 may be stored in alcoholic solution for a long time, for instance several days at RT without any noticeable change. Ethanol and water is distilled off from the mixtures of examples 1 to 3 at temperatures of up to 40° C. and pressures of up to 30 mbar using a rotary evaporator. No silicon-containing species is lost. This was confirmed by IR spectroscopy.

The resulting sol mixtures are highly viscous liquids which are poured in the desired mould. The sol cannot be stored for longer time at this stage. Gel formation occurs after several hours (up to 12 h) even at lower temperatures (refrigerator T=−4° C.). At room temperature, the sol is converted to a sticky mass which can not be casted after several hours (up to 3 h).

The composite compositions poured in a mould were cured at higher temperatures. In a first step, the composition was cured for up to 12 h at 60° C. in an oven (model Binder). Subsequent curing was achieved at T=100° C. and T=130° C. (each for up to 12 h). In this curing step residual ethanol is released. After curing at T=130° C. the samples were significantly hardened and clear and glassy solids which were removed mechanically from the moulds. Using higher temperatures at normal conditions increased the likeliness of crack formation.

IR spectroscopy on the moulded articles removed revealed the presence of silanol groups (Si—OH) as well as residual alkoxy groups (ratio about 1:1). No significant amount of free water was detected. The samples were not stable in alcoholic solution. Annealing at 50° C. led to complete cracking. When the samples were kept in water (50° C., 12 h) their appearance became cloudy. A TG analysis (1° C./min) on such a sample indicated a mass loss of up to 7-8 wt % at a temperature of up to 200° C. and a further mass loss of up to 13 wt % at a temperature of up to 350° C. Water and residual ethanol are released.

C. Heat Treatment

To overcome these deficiencies, the lens removed from the mould is subjected to further annealing up to T=200° C. (the regime of highest mass loss). The heat treatment was conducted under an atmosphere of ethanol vapour. For this purpose, the samples were placed in an oven (oven volume=39 l). A balance in the oven was used to monitor the mass loss of the samples. In addition, 120 g of ethanol were placed in the oven chamber. Upon slowly heating the oven, ethanol starts to vaporize, filling the oven chamber with ethanol vapour and thus replacing the overall atmosphere. In addition, further reservoirs of ethanol and water were attached outside the oven. These reservoirs were connected to the oven chamber and could be heated separately to the desired temperature. Thus, additional alcohol or water vapour could be provided to the oven chamber. A gas, preferably an inert gas (e.g. compressed air, argon, nitrogen) could be used as a carrier gas for the vapours. Different overall partial pressures of water and alcohol could be adjusted inside the oven chamber. Without using a controlled atmosphere at higher temperatures, the sample annealing was not homogeneous. While the surface of the solid became very hard and homogeneous, the centre of the bulk sample remained jelly.

An optimized heating protocol was developed. The starting mass of a sample was 9.78 g. The samples were heated up to T=130° C. during 1 h and then in 10 h up to T=160° C. (3° C./h). The sample was maintained for 10 h at this temperature. The mass was then 9.46 g (−3.3%). Thereafter, the sample was cooled again to RT or directly heated to the second annealing temperature. In the latter case, the sample was heated for 3 h up to 160° C. again and then within 10 h up to 180° C. (2° C./h). The sample remained at this temperature for 10 h. The mass was then 9.34 g (−1.3%). The next heating step was performed from 180° C. up to 190° C. in 10 h (1° C./h). The sample remained for 10 h at this temperature. The mass was then 9.26 g (−0.86%). Finally, the sample was raised from 190° C. up to 200° C. in 10 h (1° C./h) and remained there again for 10 h. After this treatment, the sample was a clear and hard glassy solid without any cracks. The mass was 9.21 g (−0.54%). When the material was kept for additional 10 h at 200° C., a further mass loss was observed. The mass was then 9.16 g (−0.54%).

Thus, the total mass loss by the heat treatment from 130° C. up to 200° C. was 6.3%. The observed mass loss is in agreement with the TG data presented above. No free Si—OH groups can be detected any more by IR spectroscopy. TG measurement on a sample annealed up to 200° C. up to 500° C. exhibited a mass loss of 2 wt.-%. The samples are stable against solutions of ethanol and water. Especially water resistance was studied in more detail. The sample did not alter in an atmosphere of 45% humidity (60° C.) for several days. The CTE (coefficient of thermal expansion) of samples annealed for up to 200° C. was measured to be about 200 ppm/K. The CTE of samples annealed for up to 250° C. was measured to be about 130 ppm/K.

What is claimed is:

1. A process for preparing a molded article, wherein the process comprises:
   (1) hydrolyzing, based on a total weight of (a) plus (b) plus (c),
      (a) from 70 to 50 wt.-% of at least one silane of formula $RSiX_3$ (I), wherein R is a non-hydrolyzable organic group, and the groups X, which may be the same or different, represent hydrolyzable groups, and
      (b) from 20 to 40 wt.-% of at least one compound selected from at least one of
         (b1) silanes of formula $R_2SiX_2$ (II), wherein the groups R, which may be the same or different, represent non-hydrolyzable organic groups, or the groups X, which may be the same or different, represent hydrolyzable groups, and
         (b2) hydrolyzable polysiloxanes comprising non-hydrolyzable organic groups,
      (c) from 0 to 20 wt.-% of at least one silane of formula $SiX_4$ (III), wherein the groups X, which may be the same or different, represent hydrolyzable groups,
      to prepare a composite composition comprising at least one of a hydrolyzate and a condensate of the hydrolyzable components,
   (2) placing the composite composition in a mold,
   (3) curing the composite composition to increase the degree of condensation to prepare a molded article,
   (4) removing the molded article from the mold, and (5) heat treating the molded article at a temperature of at least 100° C.

2. The process of claim 1, wherein the non-hydrolyzable groups R of silanes of formula (I) and (II) and the non-hydrolyzable organic groups of polysiloxanes comprise one or more of alkyl, aryl, alkylaryl, or aralkyl groups.

3. The process of claim 2, wherein non-hydrolyzable groups R of silanes of formula (I) and (II) and the non-hydrolyzable organic groups of polysiloxanes comprise $C_1$-$C_4$-alkyl groups.

4. The process of claim 1, wherein (b2) comprises a linear polysiloxane.

5. The process of claim 1, wherein at least 1 wt.-% of (c) is used.

6. The process of claim 1, wherein at least one further substance selected from inorganic nanoscale particles, organic solvents or hydrolyzable oligosiloxanes is incorporated into the composite composition or a precursor thereof before, during or after hydrolysis.

7. The process of claim 1, wherein (1) is carried out in at least two steps comprising pre-hydrolysing one or more hydrolyzable components of a first hydrolysis reactivity to obtain a pre-hydrolyzate reaction mixture and subsequently adding one or more hydrolyzable components of a second hydrolysis reactivity which is higher than the first hydrolysis activity to the reaction mixture.

8. The process of claim 1, wherein (3) is carried out at least partially at an elevated temperature of at least 40° C.

9. The process of claim 1, wherein the process further comprises carrying out a thermal post-treatment of the molded article at a temperature of at least 150° C. after (5).

10. The process of claim 1, wherein at least one substance in a gaseous state selected from water or organic solvents is fed to an atmosphere under which (5) is carried out.

11. A process for preparing a molded article, wherein the process comprises:
(1) hydrolyzing
 (a) at least one silane of formula $RSiX_3$ (I), wherein R is a non-hydrolyzable organic group, and the groups X, which may be the same or different, represent hydrolyzable groups, and
 (b) at least one compound selected from at least one of
  (b1) silanes of formula $R_2SiX_2$ (II), wherein the groups R, which may be the same or different, represent non-hydrolyzable organic groups, and the groups X, which may be the same or different, represent hydrolyzable groups, or
  (b2) hydrolyzable polysiloxanes comprising non-hydrolyzable organic groups,
 (c) optionally, at least one silane of formula $SiX_4$ (III), wherein the groups X, which may be the same or different, represent hydrolyzable groups,
 to prepare a composite composition comprising at least one of a hydrolyzate and a condensate of the hydrolyzable components,
(2) placing the composite composition in a mold,
(3) curing the composite composition to increase the degree of condensation to prepare a molded article,
(4) removing the molded article from the mold, and
(5) heat treating the molded article at a temperature of at least 100° C.;
at least one further substance selected from inorganic nanoscale particles which comprise oxides being incorporated into the composite composition or a precursor thereof before, during or after hydrolysis.

12. A process for preparing a molded article, wherein the process comprises:
(1) hydrolyzing
 (a) at least one silane of formula $RSiX_3$ (I), wherein R is a non-hydrolyzable organic group, and the groups X, which may be the same or different, represent hydrolyzable groups, and
 (b) at least one compound selected from at least one of
  (b1) silanes of formula $R_2SiX_2$ (II), wherein the groups R, which may be the same or different, represent non-hydrolyzable organic groups, and the groups X, which may be the same or different, represent hydrolyzable groups, or
  (b2) hydrolyzable polysiloxanes comprising non-hydrolyzable organic groups,
 (c) optionally, at least one silane of formula $SiX_4$ (III), wherein the groups X, which may be the same or different, represent hydrolyzable groups,
 to prepare a composite composition comprising at least one of a hydrolyzate and a condensate of the hydrolyzable components,
(2) placing the composite composition in a mold,
(3) curing the composite composition to increase the degree of condensation to prepare a molded article,
(4) removing the molded article from the mold, and
(5) heat treating the molded article at a temperature of at least 100° C.;
water being used in (1) in such an amount that a ratio of water to hydrolyzable groups of components (a), (b), and (c) is from 0.2 to 0.8.

13. A molded article, wherein the article comprises a glassy, organically modified condensation product of
(a) from 70 to 50 wt-% of at least one silane of formula $RSiX_3$ (I), wherein R is a non-hydrolyzable organic group, and the groups X, which may be the same or different, represent hydrolyzable groups, and
(b) from 20 to 40 wt-% of at least one compound selected from at least one of
 (b1) silanes of formula $R_2SiX_2$ (II), wherein the groups R, which may be the same or different, represent non-hydrolyzable organic groups, and the groups X, which may be the same or different, represent hydrolyzable groups, or
 (b2) hydrolyzable polysiloxanes comprising non-hydrolyzable organic groups, and
(c) from 0 to 20 wt-% of at least one silane of formula $SiX_4$ (III), wherein the groups X, which may be the same or different, represent hydrolyzable groups,
and, optionally, nanoscale inorganic particles embedded in the condensation product.

14. The molded article of claim 13, wherein the molded article is an optical lens.

15. The molded article of claim 13, wherein the molded article is comprised in a vehicle.

16. The molded article of claim 15, wherein the molded article is comprised in an automobile headlight.

17. The molded article of claim 13, wherein the molded article is or is comprised in an optical component.

18. The molded article of claim 17, wherein the optical component comprises a lens array.

19. The molded article of claim 17, wherein the optical component comprises one or more of a prism and a magnifying glass.

20. The molded article of claim 17, wherein the optical component comprises an eye glass.

* * * * *